(12) United States Patent
Liljenstolpe et al.

(10) Patent No.: US 9,722,874 B2
(45) Date of Patent: Aug. 1, 2017

(54) INFERENCE-BASED NETWORK ROUTE CONTROL

(71) Applicant: Metaswitch Networks Ltd, Enfield (GB)

(72) Inventors: Christopher Liljenstolpe, San Francisco, CA (US); Michael Curtis, San Francisco, CA (US)

(73) Assignee: Metaswitch Networks Ltd, Enfield (GB)

( * ) Notice: Subject to any disclaimer, the term of this patent is extended or adjusted under 35 U.S.C. 154(b) by 58 days.

(21) Appl. No.: 14/610,885

(22) Filed: Jan. 30, 2015

(65) Prior Publication Data
US 2016/0226711 A1  Aug. 4, 2016

(51) Int. Cl.
| | | |
|---|---|---|
| *H04L 12/24* | (2006.01) | |
| *H04L 12/751* | (2013.01) | |
| *H04L 12/753* | (2013.01) | |
| *H04L 12/725* | (2013.01) | |

(52) U.S. Cl.
CPC ...... *H04L 41/0893* (2013.01); *H04L 41/0813* (2013.01); *H04L 45/02* (2013.01); *H04L 45/306* (2013.01); *H04L 45/48* (2013.01)

(58) Field of Classification Search
CPC ...................................................... H04L 45/00
See application file for complete search history.

(56) References Cited

U.S. PATENT DOCUMENTS

| | | | | |
|---|---|---|---|---|
| 7,546,333 | B2 * | 6/2009 | Alon ...................... | H04L 29/06 707/999.001 |
| 7,554,998 | B2 * | 6/2009 | Simonsson ............. | H04L 45/00 370/252 |
| 7,782,793 | B2 * | 8/2010 | Olesinski ............ | H04L 41/0893 370/253 |
| 8,325,612 | B1 * | 12/2012 | Ruiz ....................... | H04L 45/16 370/238 |
| 9,042,234 | B1 * | 5/2015 | Liljenstolpe ............ | H04L 45/00 370/238 |
| 2003/0063568 | A1 * | 4/2003 | Teig .................... | G06F 17/5077 370/252 |
| 2006/0146825 | A1 * | 7/2006 | Hofstaedter ............ | H04L 45/00 370/392 |
| 2007/0022075 | A1 * | 1/2007 | Horvitz .................... | G06F 8/35 706/52 |

(Continued)

*Primary Examiner* — Parth Patel
(74) *Attorney, Agent, or Firm* — EIP US LLP

(57) ABSTRACT

Described herein is an inference-based approach to process network route definitions, e.g. routes received from other network devices according to a defined routing protocol. In examples, at least one proposition is defined that relates to at least one property of the route. Probabilities are also defined in association with the proposition. A first probability may be indicative of a randomly-selected network route and a second probability may be indicative of randomly-selected network route that is suitable for use in routing network traffic. In certain examples, a probability that a given route is malicious or erroneous may be computed. Probabilities may be calculated by processing historical routing data, such as network route definitions that are labelled as suitable for routing traffic. Probabilities may also be evaluated cumulatively over multiple routing policy elements. Final actions may be made by applying a configurable range or threshold to an output confidence value.

14 Claims, 6 Drawing Sheets

(56) References Cited

U.S. PATENT DOCUMENTS

| | | | | |
|---|---|---|---|---|
| 2007/0033176 | A1* | 2/2007 | Enns | H04L 45/54 |
| 2007/0271232 | A1* | 11/2007 | Mattox | G06Q 10/10 |
| 2009/0122797 | A1* | 5/2009 | Thubert | H04W 40/246 |
| | | | | 370/392 |
| 2010/0223404 | A1* | 9/2010 | Butler | H04L 41/0806 |
| | | | | 710/38 |
| 2011/0032818 | A1* | 2/2011 | Yamaguchi | H04L 45/02 |
| | | | | 370/225 |
| 2011/0299422 | A1* | 12/2011 | Kim | H04W 48/16 |
| | | | | 370/253 |
| 2012/0051363 | A1* | 3/2012 | Zahemszky | H04L 45/14 |
| | | | | 370/392 |
| 2012/0158949 | A1* | 6/2012 | Lee | H04L 41/0893 |
| | | | | 709/224 |
| 2012/0209581 | A1* | 8/2012 | Gao | H04L 41/0893 |
| | | | | 703/13 |
| 2012/0240226 | A1* | 9/2012 | Li | H04L 63/0209 |
| | | | | 726/22 |
| 2015/0009831 | A1* | 1/2015 | Graf | H04L 47/31 |
| | | | | 370/236 |
| 2015/0029887 | A1* | 1/2015 | Briscoe | H04L 47/326 |
| | | | | 370/252 |
| 2015/0117282 | A1* | 4/2015 | Morgan | H04W 40/005 |
| | | | | 370/311 |
| 2016/0182329 | A1* | 6/2016 | Armolavicius | H04L 43/08 |
| | | | | 370/230 |
| 2016/0197831 | A1* | 7/2016 | De Foy | H04L 45/566 |
| | | | | 370/392 |

* cited by examiner

INFERENCE-BASED NETWORK ROUTE CONTROL

BACKGROUND OF THE INVENTION

Field of the Invention

The present invention relates to inference-based network route control. In particular, but not exclusively, the present invention relates to processing routes for modification of a routing definition, the routing definition being used by a network device to route network traffic in an electronic data network.

Description of the Related Technology

In a communications network, network devices are arranged and configured to control how information is transmitted across the network. For example, in a packet-switched network, one or more network devices such as routers, bridges, gateways, firewalls and switches may be arranged and/or configured to selectively forward packets across the network. A network device may use a routing definition such as a routing table that lists a number of routes or paths through the network to deliver a packet to a defined destination. These network devices may also be arranged to perform a number of control plane routing functions, such as filtering packets, discarding packets, or providing certain packets with preferential routing. A typical network device comprises an embedded computing device with a microcontroller arranged and configured to load computer program code in the form of firmware from a read-only or flash memory.

Large scale networks, such as the Internet, use a variety of routing protocols to determine how network traffic is to be routed through a large number of heterogeneous networks. These networks initially used static routing definitions. However, these quickly became impractical given the number of interconnected networks and the organic growth of connections. Hence, routing protocols such as Border Gateway Protocol (BGP) were developed. These routing protocols allow particular networks or routing domains, which are referred to in BGP as autonomous systems, to exchange routing information so as to agree upon a suitable path for routing network traffic. Typically, network devices within each autonomous system exchange network route definitions, e.g. proposed routes, and a routing policy is implemented by a given network device to determine which route definitions are to be added to the network device's working routing definition or table. For example, a router may receive several different proposed routes for routing network traffic, such as data packets, to a given destination. The router would thus implement a routing policy to determine which of the several different proposed routes to use. A routing policy may be applied to one or more route attributes that are defined as part of the received network route definitions. For example, one attribute is AS_PATH, i.e. a definition of the path through one or more autonomous systems that is associated with the route. If a proposed route passes through autonomous systems 1, 3 and 5 then the AS_PATH may be defined as {1, 3, 5}. Certain routing policies select a proposed route based on the AS_PATH length. In the aforementioned example the path length is 3, and this network route definition may be selected over a proposed route with a path length of 5.

While routing protocols such as BGP have been successful at managing with the growth of large scale networks such as the Internet there are a number of issues with their use. A first issue is network security. If malicious parties hijack the exchange of network route definitions they may be able to suggest their own insecure routes over a number of more secure alternative routes. For example, a malicious party may hijack the exchange of network route definitions to perform surveillance, industrial espionage, or fraud. Man-in-the-middle attacks that operate on this basis, e.g. advertising a route through a malicious party's network devices in order to intercept network traffic, are becoming increasing common. They are also difficult to detect; the malicious party may continue to route the network traffic to its defined destination making it difficult for either the sender or the receiver to determine that the traffic has been intercepted. In 2013, attacks such as these were detected on at least 60 days of the year with over 1,500 individual Internet Protocol (IP) blocks being hijacked, with hijackers working in a number of different countries and hijacking events lasting from minutes to days.

A second issue is routing error. For example, if an incorrect or inefficient route is advertised, and it complies with the implemented routing policy (e.g. it provides a shorter path than comparative routes), it can quickly become the default route for large quantities of network traffic. For example, if a small organization managing a particular autonomous system erroneously or accidently advertisers a route through its networks for a popular Internet site, then these networks can be very rapidly overwhelmed by huge quantities of network traffic. This may not only take the network devices of the small organization offline, it may also take down the popular Internet site. On 24 Feb. 2008, YouTube® was taken offline for an hour as an error lead to worldwide network traffic for YouTube® being routed through a single country's servers, which were unable to cope with the network load. This was due to an incorrect route being advertised and propagating over the BGP control plane Routes that are not necessarily erroneous but that are simply inefficient may also easily be added to the routing tables of hundreds if not millions of network devices. For example, if a routing policy is configured to select a shortest path, this may not always be the quickest path, e.g. a longer path may have faster physical connections or better bandwidth.

A third issue is the size of Internet. There are over 40,000 autonomous systems on the Internet and active BGP entries in a typical routing table have been rising exponentially. For example, the BGP Forwarding Table has over half a million active entries.

One approach to addressing these issues is to increase the complexity of routing policies. Certain network devices have routing policies that are implemented based on a number of "policy statements". In these cases each policy statement can either accept, reject, or otherwise modify a proposed route, or let a following statement evaluate it. Boolean logic is applied on a complete set of policy statements. The final outcome of this process is either a rejection of the proposed route, or an acceptance with an optional modification of metadata associated with the route. Based on this approach, rules for adding a proposed route are arranged into complex Boolean decision trees. These are often difficult to update when new threats are uncovered and quickly become extremely complex. For example, certain existing BGP policy implementations have over half a million policy statements, with an expectation that these will continue to grow in size. As such, maintaining such policy statements is expensive, slow and prone to error. It also means that network operators are not able to respond to new threats on the timescales needed to mitigate them.

There is thus a desire to address the aforementioned issues in an efficient manner. For example, there is a desire to configure network devices such that security threats may be reduced while minimizing a risk of increased error and/or complexity.

SUMMARY

According to a first embodiment of the present invention, there is provided a network control device comprising: a policy engine arranged to receive data indicative of a network route and to process said data based on a plurality of policy elements, each policy element comprising: data defining a proposition, the proposition relating to at least one network route property; data indicative of a probability of the proposition being true of a randomly-selected network route, and data indicative of a probability of the proposition being true of a randomly-selected network route that is suitable for use in routing network traffic, wherein the policy engine is configured to evaluate the plurality of policy elements in relation to the data indicative of the network route using statistical inference to determine a confidence value, the policy engine being configured to indicate an action to be performed based on the confidence value.

According to a second embodiment of the present invention, there is provided a method for generating routing configuration data comprising: accessing data indicative of a corpus of network route definitions, each network route definition in the corpus comprising: data indicative of one or more route attributes, and data indicating whether a route is suitable for use in routing network traffic; processing the data indicative of the corpus to determine data indicative of a plurality of probability values, the plurality of probability values comprising: a value for a probability of a route being suitable for use in routing network traffic, a value for a probability of a route having at least one route attribute, a value for a conditional probability of a route having the at least one route attribute given the route being suitable for use in routing network traffic; and generating routing configuration data comprising at least one policy element, the policy element encoding the plurality of probability values, the routing configuration data being for use in selectively modifying a routing definition of a network device.

According to a third embodiment of the present invention, there is provided a routing configuration file arranged to implement a routing policy comprising: a plurality of policy elements for the routing policy, each policy element being configured to probabilistically associate a suitability of a network route with at least one network property of the network route, an encoding of a value indicative of a prior probability indicative of the suitability of a randomly-selected network route, each policy element comprising data encoding: data defining a proposition, the proposition relating to the at least one network route property; data indicative of a probability of the proposition being true of a randomly-selected network route, and data indicative of a probability of the proposition being true of randomly-selected network route that is suitable for use in routing network traffic, the routing configuration file being configured to be implemented as a routing function that is applied to a supplied network route definition, the supplied network route definition indicating a value for the at least one network property, the routing function applying the encoded values in an inference operation to output a value indicative of the suitability of a network route.

According to a fourth embodiment of the present invention, there is provided a method for processing route data in a computer network comprising: receiving route data indicative of a network route; applying a routing function to the received route data to determine at least one confidence value for at least one property applicable to the network route, including: determining a value for a route attribute from the received route data, and applying statistical inference based on the determined value for the route attribute to determine the at least one confidence value; and determining an action to be applied to the received route data based on the at least one confidence value.

Further features and advantages of the invention will become apparent from the following description of certain embodiments, which is made with reference to the accompanying drawings.

DETAILED DESCRIPTION OF CERTAIN INVENTIVE EMBODIMENTS

Figure 1:
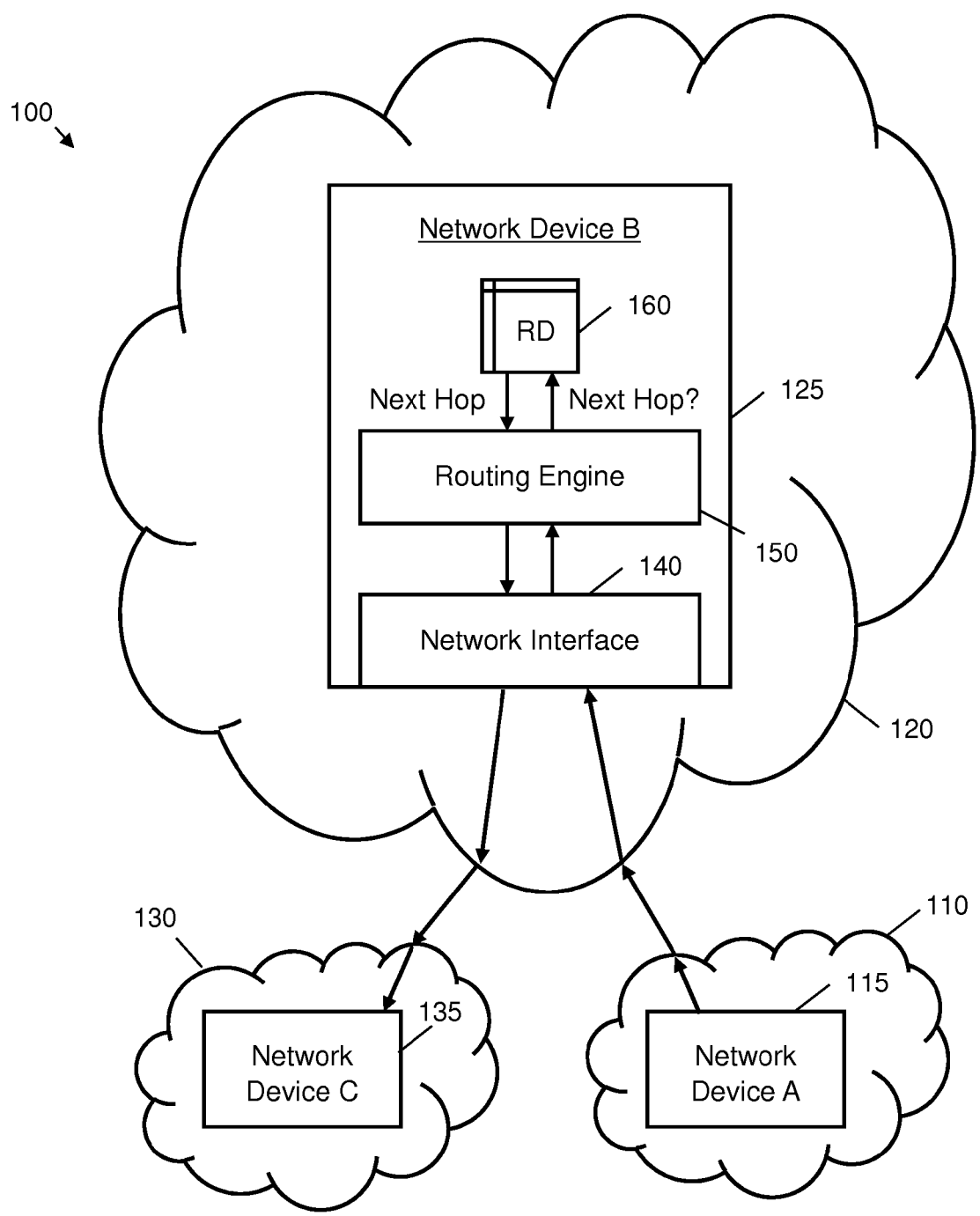
FIG. 1 is a schematic diagram showing a network device using a routing definition according to one or more embodiments of the present invention.

Certain examples described herein use an inference-based approach to process network route definitions, e.g. routes received from other network devices according to a defined routing protocol. For example, rather than use a series of Boolean decision trees to assess whether a route should be added to a routing definition as found in comparative cases, certain examples described herein use a system of statistical inference to evaluate the route. Statistical inference may be applied based on Bayesian or other statistically-based analysis. In this case, at least one proposition is defined that relates to at least one property of the route. Probabilities are also defined in association with the proposition. A first probability may be indicative of the proposition being true of a randomly-selected network route and a second probability may be indicative of the proposition being true of randomly-selected network route that is suitable for use in routing network traffic. As such, a probability that a given route is malicious or erroneous may be computed. Probabilities may be calculated by processing historical routing data, such as network route definitions that are labelled as acceptable (e.g. suitable for routing traffic) or a security risk. These probabilities may also be evaluated cumulatively over multiple routing policy elements, i.e. the effects of all policy elements accumulate together. This may be compared with a decision tree approach, where large parts of a given tree may not be evaluated for a route. In one case, as the rules of statistical inference are commutative the need for complex decision trees is avoided and adding and removing new policy elements is easy; the evaluation order of multiple policy elements does not affect a final output confidence or probability value, they may be applied in any order. Final actions, e.g. to add a route to a routing definition, to discard a route or to flag a route for further analysis may be made by applying a configurable range or threshold to a final output probability value, which may be seen as a confidence value.

By using such an inference-based approach, policy elements may be easily added to a routing policy that avoid and/or reduce many existing security threats. For example, a policy element may encode a proposition such as: "does the autonomous system originating the route belong to the same country as the destination prefix?" This relates to a property of a route. A plurality of propositions such as this may then be evaluated for a received route and a confidence value may be generated that is indicative of a probability that the route is malicious or erroneous (e.g. is a "bad" route). Data indicative of probabilities evaluated by each policy element may be generated through the processing a corpus of categorized routes, e.g. where each route has metadata indicative of whether it is suitable for routing network traffic. For example, a method for generating routing configuration data may be performed that applies a machine learning approach to automatically detect correlations between route attributes and whether a route is "good" or "bad", e.g. routes with a high security risk. Using the approach described in relation to certain examples herein, many hijacks and errors, including the route advertisement that brought down YouTube®, would have a high likelihood of being deemed unsuitable for network traffic.

An Example Network Device and Routing Operation

An example network device and routing operation will now be described to explain the context of certain later described examples. FIG. 1 shows a network device using a routing definition according to an example 100. FIG. 1 shows three autonomous systems 110, 120 and 130. Each autonomous system comprises a network or group of networks, e.g. a routing domain that is under common control and that has agreed upon routing policies. The autonomous systems of FIG. 1 are communicatively coupled, e.g. by one or more physical network connections. In FIG. 1, an example network device is shown as being present in each autonomous system: autonomous system 110 comprises network device A 115; autonomous system 120 comprises network device B 125; and autonomous system 130 comprises network device C 135. The example 100 of FIG. 1 may be seen as a simplistic representation of a portion of the Internet.

Although only one network device is shown in example 100, each autonomous system may comprise a plurality of network devices. Network devices may comprise, amongst others, routers, bridges, gateways, firewalls and switches. These devices may be hardware devices, such as an embedded computer device, and/or virtualized devices. Any physical layer coupling may be used to communicatively couple each network device to one or more networks, for example any wired and/or wireless connections. Each network device 115, 125, 135 shown in FIG. 1 is arranged and configured to route network traffic. For example, each network device may be arranged and configured to selectively forward packets in a packet-switched network and/or filter packets (e.g. selectively discard packets). Routing may be performed for Internet Protocol (IP) packets, e.g. for one or more of version 4 (IPv4) and version 6 (IPv6).

FIG. 1 also shows an example of information being routed between the autonomous systems 110, 120 and 130. In this example, network device A 115 sends a data packet with a destination IP address equal to that of network device C 135. As a first stage this is routed to network device B 125 (e.g. based on a routing definition available to network device A 115). Network device B 125 is shown comprising a network interface 140, a routing engine 150 and a routing definition 160. The data packet is received at the network interface 140. The network interface 140 may comprise a physical network interface and/or control logic to perform one or more of physical, data link and network processing. Details of the received packet are passed to the routing engine 150. The routing engine 150 determines a destination address of the packet and queries the routing definition 160 for an address of a next hop on a path to the destination address. The routing engine 150 may thus operate at a network level. For example, the routing definition 160 may comprise a table with a column of destination network addresses or prefixes and corresponding next network device addresses. As such the routing definition 160 comprises one or more routes that are used by the network device to route network traffic. The routing engine 150 may look up the row containing the destination address or prefix that corresponds to the packet destination address and retrieve an IP address of the corresponding next network device (the "next hop"). In the example of FIG. 1, the corresponding next network device is network device C 135. The network device 120 may query a physical address (e.g. a media access control (MAC) address in the case of Ethernet) or otherwise determine how to forward the packet to the next hop via the underlying protocol.

An Example of Adding a Route to a Routing Definition

As described previously, network devices may use one or more routing protocols to co-ordinate and control the routing of information across the one or more autonomous systems. Interior gateway protocols may be used within each autonomous system and exterior gateway protocols may be used for communication between autonomous systems. For example, each network device may implement one or more routing protocols such as BGP, the Open Shortest Path First (OSPF) protocol, the Resource Reservation Protocol (RSVP), the Label Distribution Protocol (LDP) and/or the Intermediate System to Intermediate System (IS-IS) protocol. One or more routing protocols are used by each network device to communicate with other network devices so as to configure routing between nodes of various autonomous systems. For example, the network device 110 may have knowledge of at least a portion of one or more networks it is directly coupled to and may use one or more routing protocols to acquire further knowledge of a wider network and/or additional devices on or one or more further networks. In the example of FIG. 1, an exterior gateway protocol such as BGP enables network devices to exchange information across autonomous systems, whereas each autonomous system may use an interior gateway protocol to control routing within its respective network or networks.

Figure 2A:
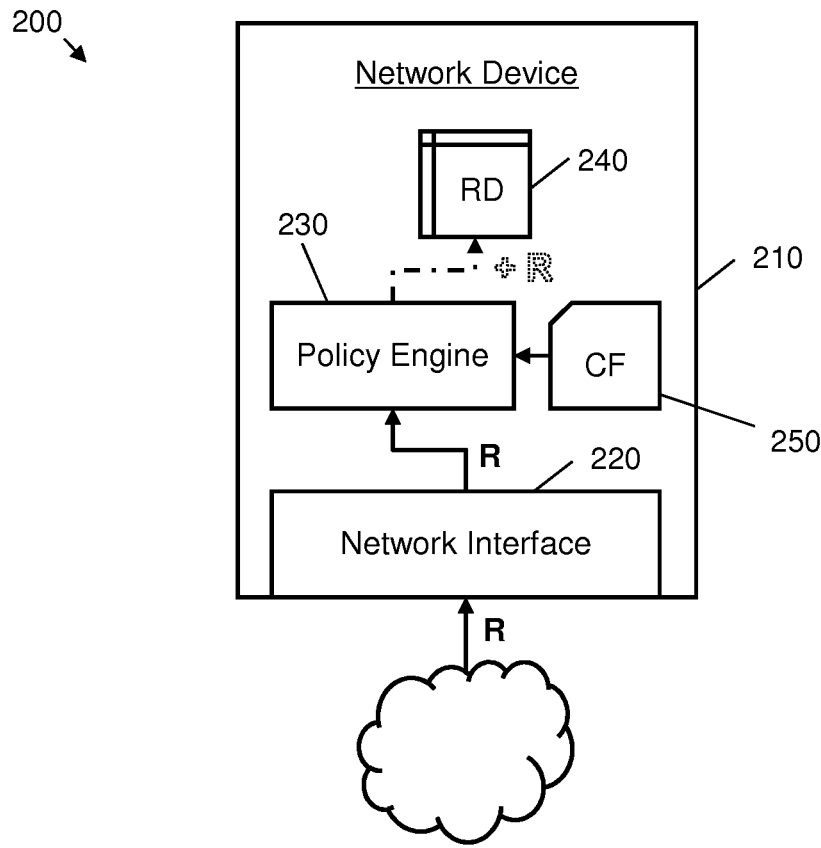
FIG. 2A is a schematic diagram showing a network device controlling route definition modification according to one or more embodiments of the present invention.

FIG. 2A shows an example 200 of a network device 210 implementing BGP to configure a routing definition. The network device 210 may be any one of the network devices 115, 125, 135 of FIG. 1.

The network device 210 of FIG. 2A comprises a network interface 220, a policy engine 230 and a routing definition 240. The network interface 220 may comprise a network interface such as network interface 140 (e.g. the same interface that is used to receive packets over one or more network couplings) or an independent network interface (e.g. a dedicated side channel for the exchange of control information). The policy engine 230 is arranged to process a routing configuration file 250 in order to implement a BGP routing policy. The BGP routing policy is defined by way of electronic data from the routing configuration file 250.

The BGP routing policy defined in routing configuration file 250 enables packets to be selectively communicated over a number of different paths depending on a number of configurable criteria. For example, in addition to (or instead of) a default network traffic path (e.g. based on a packet's destination address), it may be desired to selectively route packets based on, amongst others, one or more of: path bandwidth, path switching, traffic loading, packet priority, packet source and packet destination. Further, use of the BGP routing policy allows for a network operator to control which routes are installed and/or preferred in a network. For example, this may be based on a technical policy or network security policy. The routing configuration file comprises a plurality of policy elements, which are processed by the policy engine 230.

In FIG. 2A, the network device 210 is arranged to receive, via the network interface 220, a proposed route—"R"—for addition to the routing definition 240. For example, this may be a route advertised by, e.g. sent out from, a network device in a neighboring autonomous system. It may also be a route advertised by a network device within the network or networks of the autonomous system of network device 210, e.g. a policy server as described later below. The proposed route may be in the form of a network route definition. A network route definition for BGP for IP may comprise one or more of: an IP prefix for which the route applies (e.g. 10.11.0.0/16 indicates that this route applies to all IP addresses that match 10.11 in their first 16 bits—e.g. applies for the destination network 10.11); a next hop, which is the address of a network device (e.g. a router) to which packets for that prefix should be sent (this may be the same address as the router that is advertising the route); an autonomous system (AS) path, which is a sequence of autonomous system numbers indicating who the route was learned from; communities, a list of 32-bit labels which are agreed between the two parties exchanging routes (e.g. they may use label 1234 to indicate a high-bandwidth route or 5678 to indicate a route that should only be used on Thursdays); and various other metadata.

The policy engine 230 receives the proposed route from the network interface 220 and implements the routing policy defined in the routing configuration file 250 to control whether the routing definition 240 is to be modified based on the proposed route. Modification of the routing definition 240 may comprise at least one of: adding a proposed route to the routing definition 240; modifying data for an existing route in the routing definition based on the proposed route; and removing a route from the routing definition 240 based on the proposed route (e.g. removing or dropping the proposed route). For example, the policy engine 230 may implement the routing policy defined in the routing configuration file 250 to prioritize between routes that share prefixes, e.g. which are for a common destination. The policy engine 230 may process a network route definition associated with a proposed route to determine, amongst others, one or more of: origin AS for the route, intermediate AS path characteristics, length of the path, peer that the path was learned from, community strings set on the path, etc. If a proposed route is to be accepted by the network device 210 and added to the routing definition 240, e.g. based on the routing policy defined in the routing configuration file, then the policy engine 230 may also determine whether any attributes of the accepted route are to be modified for addition to the routing definition. For example, an accepted route may be modified to set a relative preference, delete or sanitize certain information associated with the route (e.g. removing private information) and/or tag the route with additional information. In FIG. 2A, a dashed line between the policy engine 230 and the routing definition 240 indicates that a receive route may be selectively added to the routing definition 240 based on processing performed by the policy engine 230. In one case, implementation of the routing policy defined in the routing configuration file 250 may comprise adding a proposed route to a temporary store for further analysis by a security analyst. This may include sending a notification to the analyst.

An Example Policy Server

Figure 2B:
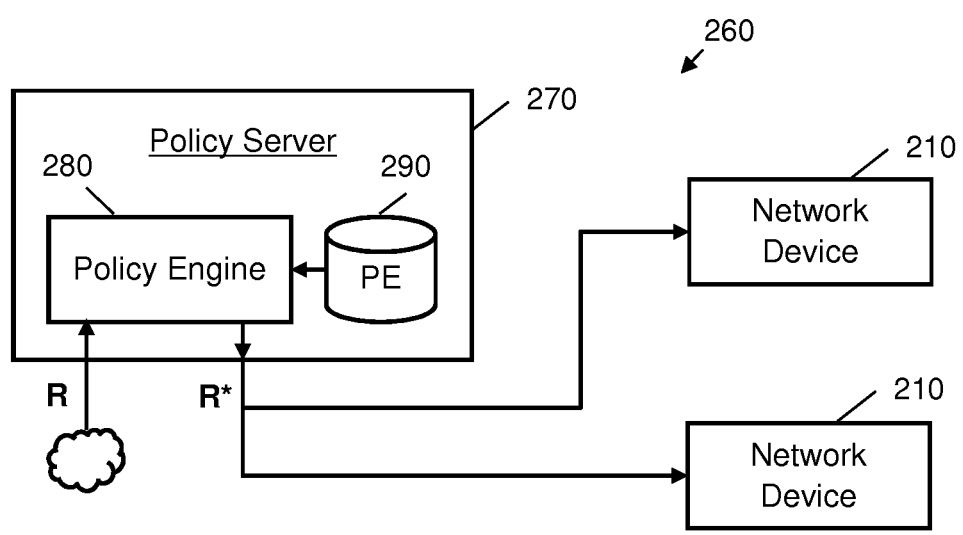
FIG. 2B is a schematic diagram showing a policy server according to one or more embodiments of the present invention.

In certain examples, network device 210 may comprise a virtual and/or distributed network device. In this case, it may be implemented using computer program code in at least one server computing device. In certain examples, the routes ("R") received by the network device 210 may comprise metadata that is configured by a policy server. An example of a policy server is shown in FIG. 2B. The policy server is a network control device as it manages route processing on the network. In certain cases it may also comprise a network device capable of routing traffic.

FIG. 2B shows an example 260 of a policy server 270. The policy server 270 comprises a policy engine 280 that is arranged to receive data indicative of a network route ("R") and to process said data based on a plurality of policy elements 290. This results in a modified route ("R*"). As shown in FIG. 2B the modified route R* may be transmitted to network devices 210. The route may be modified by adding, editing or deleting metadata associated with the route. The modified route R* may be processed as described above with regard to FIG. 2A. In certain cases, policy engine 280 may be an alternative version of policy engine 230. In the example of FIG. 2B, the policy engine 280 accesses policy elements 290 from a storage medium; however, these may also, or alternatively, be accessed from an external device and/or a routing configuration file.

The policy server 270 of FIG. 2B may be arranged to perform centralized policy processing on behalf of network devices 210. As such the policy engines 230 of the network device 210 may be "thin" policy engines 230, e.g. arranged to rapidly process a simplified configuration file, wherein more processor intensive policy processing is performed by the policy engine 280 of the policy server 270. The more intensive policy processing may be performed on behalf of the network devices 210. As such, the modified route R* may comprise metadata that results from the policy processing performed by policy engine 280. This metadata may be an indication to accept or reject a route.

One of several methods may be selected to control the routing behavior of network devices 210 from the policy server 270. Certain example methods are described below. These may be used in any combination.

In one case the policy server 270 may receive routes (R) from at least one border network device in its network. The border network device may be located at a border of an autonomous system in the plurality of autonomous systems. In this case one or more of network device 210 may send routes (R) as well as received modified routes (R*). In one case, modified route data may be transmitted to the network devices using a mechanism that enables advertisement of multiple routes to the same destination prefix. This mechanism may use one or more of the add-path extension to BGP and one or more internal BGP sessions. In one case the policy server 270 may operate as a route reflector entity in the network, wherein at least one border network device (e.g. one of network devices 210) is configured to operate as a route reflector client in the network. In this case, routes (R) may be received at the network device from the at least one border network device and modified routes (R*) may be transmitted from the policy server 270 to the at least one border network device via a route reflector and route reflector client route data propagation mechanism. The policy server 270 may also be configured to transmit at least part of a modified route (R*) to at least one further border network device which is configured to operate as a route reflector client in the network. In this case, the at least part of the modified route data is operable to instruct the at least one further border network device to modify the behavior of at least one of its configured routes.

In certain cases, a modified route (R*) may not comprise data indicating that the route data was previously received from the same network device that transmitted the original route (R). The original route (R) may comprise route data for one or more preferred routes and route data for one or more less preferred routes. In one case, the policy server 270 operates as a monitoring entity in the network, wherein at least one border network device, e.g. one of network devices 210, is configured to recognize the policy server 270 as a route data monitoring entity. In this case, routes (R) are received at the policy server 270 from the border network device and the modified route data is transmitted from the policy server 270 to the at least one network device 210 via a route data monitoring protocol. In certain cases, at least part of the modified route (R*) does not comprise data identifying an autonomous system in which the policy server 270 is located.

In one case, the policy server 270 may be arranged to operate as device to operate as a Resource Public Key Infrastructure (RPKI) server, wherein at least one network device is configured to operate as a RPKI client in the network. In this case, routes (R) may be received at the policy server 270 from the at least one network device and the modified routes (R*) may be transmitted from the policy server 270 to one or more network devices 210 via a RPKI query and response mechanism.

In the discussion of policy processing discussed below, it should be understood that this processing may be performed at one or more of the policy engines 230, 280; e.g. it may be performed at a network device 210 or may be performed on a centralized basis by policy server 270.

Example Routing Configuration File

Figure 3A:
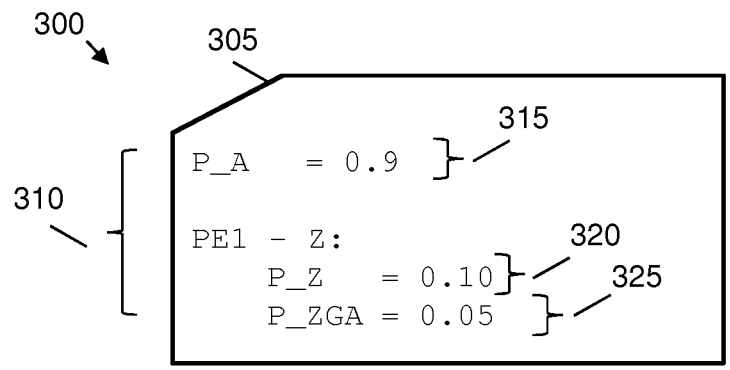
FIG. 3A is a schematic diagram showing a first example of at least a portion of a routing configuration file according to one or more embodiments of the present invention.
Figure 3B:
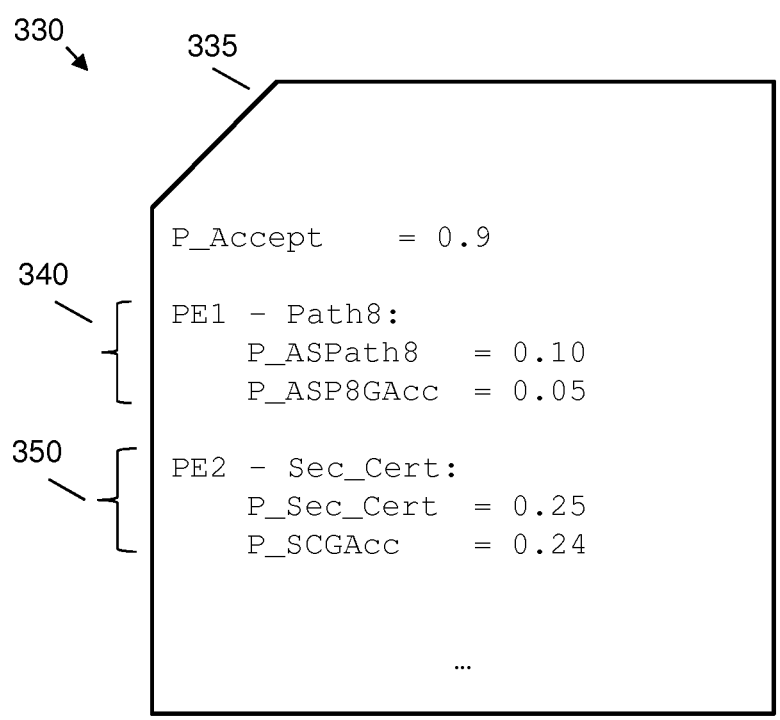
FIG. 3B is a schematic diagram showing a second example of at least a portion of a routing configuration file according to one or more embodiments of the present invention.

FIGS. 3A and 3B respectively show a first example 300 and a second example 330 of a routing configuration file 305, 335. Each routing configuration file shows a number of policy elements. As discussed above, the policy elements need not form part of a routing configuration file but may be retrieved from a local or remote storage device.

The first example 300 of a routing configuration file 305 shows a first policy element 310. The policy element 310 comprises data that is used by at least one of the policy engine 230 of FIG. 2A and the policy engine 280 to evaluate a proposed route. A policy element comprises data that defines a proposition. The proposition relates to at least one network route property or aspect, in the first example 300 a network route property "Z". Each proposition is associated with data indicative of two probabilities: a probability ("P_Z") of the proposition being true of a randomly-selected network route 320, e.g. any particular route in the set of all routes, and a probability ("P_ZGA") of the proposition being true of a randomly-selected network route that is suitable for use in routing network traffic 325, e.g. any particular route selected from a subset of the set of all routes. In FIG. 3A there is a further prior probability 315 that is defined outside of the policy elements, e.g. once in the routing configuration file. In certain cases it may be defined in a configuration of the policy engine rather than the routing configuration file. In the present case, the prior probability is a probability that a randomly-selected route is suitable for use in routing network traffic, e.g. is a "good" route. In certain cases this probability may be alternatively indicated by one minus a probability that a randomly-selected route is not suitable for use in routing network traffic, e.g. is a "bad" route.

In FIG. 3A, 90% of all routes (e.g. from the set of routes receivable by a network device or policy server) are deemed to be suitable for routing network traffic ("A" in FIG. 3A). Hence, the value for the prior probability discussed above ("P_A" or P(A)) 315 is 0.9. In one example, the proposition ("Z") is associated with an AS path property, such as an AS path of 8 or more elements (e.g. 8 or more autonomous systems). In FIG. 3A, 10% of routes have 8 or more elements, i.e. the probability the proposition being true for a randomly-sampled route 320 ("P_Z" or P(Z)) is 0.1. In this example, the probability of a randomly-sampled route having an AS path greater or equal to 8 ("P_ZGA" or P(Z|A)) given that it is deemed suitable for routing network traffic is 5%, e.g. P_ZGA=0.05. Put another way, the probability value 325 indicates that of all routes that are considered correct and genuine, 5% have an AS path that is greater or equal to 8. In this example, "all routes", i.e. the reference for probabilities 315 and 320, may comprise all routes in use on a given network or set of networks, such as the Internet. The probability values 315, 320 and 325 may be calculated based on historical data, e.g. a selected sample or population of routes. One method of determining the probability values is described later with reference to FIG. 6.

In the presently described examples, a policy engine such as 230 and/or 280 is arranged to process the policy element as set out in the routing configuration file 305. In particular, the policy engine 230/280 is arranged to evaluate the policy element 310 for the proposed route using statistical (e.g. Bayesian) inference to determine a confidence value, wherein the confidence value is used to indicate an action to be performed in relation to a receive route. The action to be performed may comprise the action to be performed comprises at least one of: adding the network route to a routing definition, the routing definition comprising one or more routes that are used by a network device to route network traffic; modifying at least one attribute of the network route within the data indicative of the network route; rejecting the network route for use in routing network traffic; and flagging the network route for further processing. In one case the policy engine 280 may indicate one of these actions by modifying metadata associated with a received route, e.g. editing a "communities" value. The action may then be subsequently applied by policy engine 230 based on the modified metadata. In another case the policy engine 230 may directly apply this action to the routing definition 240.

With reference to the policy element 310 of FIG. 3A, the policy engine 230 may be arranged to apply Bayesian inference to determine a confidence value or probability indicative of a route being suitable for routing network traffic, e.g. is a "good" route and is not a security threat. For example, given the data of the policy element 310, the policy engine 230 or 280 may be configured to calculate the probability of a proposed route being suitable for routing traffic given the network route property relating to the proposition ("P_AGZ" or $P(A|Z)$). This may be performed using the following equation:

$$P(A|Z)=P(A)*P(Z|A)/P(Z)$$

$$P(A|Z)=0.9*0.05/0.1$$

$$P(A|Z)=0.45$$

i.e. the policy engine 230 or 280 determines that there is a probability of 45% that a proposed route having 8 or more elements in an AS Path attribute is suitable, e.g. is not a security threat. Hence, in this case having 8 or more elements resulting in a good indication of fraudulent or "bad" routes—e.g. rather than an initial confidence of 90% that the route is not a security threat, when the attribute information is accepted the confidence that the route is not a security threat is only 45%. That is to say, based only on this information, we would only expect 45% of routes with 8 or more elements in the AS path to be "safe" to accept. A comparative case would require a Boolean evaluation of an attribute, e.g. a route with 8 or more elements would be defined in a policy statement as either being accepted or rejected. If it was set to reject based on this attribute alone, then 1 out of 20 acceptable routes would be rejected. However, in the present case the output probability ($P(A|Z)$—or to accept given the attribute) may be used as a confidence factor to determine acceptance or rejection.

As described below, further policy elements may be evaluated and the value of 45% may be evaluated cumulatively to determine a final confidence value. The policy engine 230 or 280 may be configured to evaluate any output confidence value against one or more confidence bands to determine which routing actions to indicate and/or perform with regard to a proposed route. For example, a confidence value of greater than 0.9 may be associated with an action to install the proposed route in a routing table of the network device; a confidence value falling in the range 0.6-0.9 may be associated with an action to flag the proposed route for subsequent analysis; and a confidence value of less than 0.6 may be associated with a routing action of discarding the route.

In one case different sets of actions may be associated with different confidence value ranges. For example, different pipelines may be evaluated relating to different network aspects, such as one pipeline for security, one pipeline for traffic engineering, amongst others. In this case a traffic engineering pipeline may have "modify" actions indicated and/or performed in relation to a confidence value and does not modify accept or reject behavior, which may be configured by a security one pipeline. As such a different plurality of different actions may be indicated by the policy engine 230 or 280, and these may be subsequently performed by network devices 210. In this case actions are not associated with particular policy elements, which provides flexibility and scalability.

FIG. 3B shows an example 330 of a routing configuration file 335 with a plurality of policy elements 340 and 350. These policy elements may be arranged for cumulative evaluation, in any order, by the policy engine 230 or 280 in order to output a confidence value on which an indication of an action may be made. A first policy element 340 is similar to the policy element 310 of FIG. 3A; it sets out a definition of the proposition (e.g. "the route has 8 or more elements in the AS Path") and probability values associated with the general prevalence of routes the proposition is true of, P_ASPath8, and the prevalence of the proposition among genuine routes. A second policy element 350 comprises: a definition of the proposition, "the route has a cryptographically certified route origin"; a probability of any route having a cryptographically certified route origin ("P_Sec_Cert" or $P(SC)$), which equals 25.0% (e.g. 25.0% of all routes have a cryptographic certification of route origination); and a probability of a route having a cryptographically certified route origin given it is actually genuine ("P_SC-GAcc" or $P(SC|A)$), which in this case is 25.2% (e.g. 25.2% of genuine routes have a cryptographic certification of route origination—nearly all certified routes are accepted). If a route is advertised with a cryptographic certification of route origination then the policy engine 230 may be configured to evaluate the second proposition definition according to the equation:

$$P(A|SC)=P(A)*P(SC|A)/P(SC)$$

$$P(A|SC)=0.9*0.252/0.25$$

$$P(A|SC)=0.907$$

i.e. the policy engine 230 determines that there is a probability of 90.7% that a proposed route having a certified origin is genuine. However, if a proposed route has both an AS Path of greater than 8 elements and a certified origin, the evaluations are performed in series, $$P(A|ASPath8\&SC)=P(SC|A)/P(SC)*P(ASPath8|A)/P(ASPath8)*P(A)$$

$$P(A|ASPath8\&SC)=0.252/0.25*0.05/0.10*0.9$$

$$P(A|ASPath8\&SC)=1.008*0.5*0.9$$

$$P(A|ASPath8\&SC)=0.454$$

resulting in a confidence value of 45.4%. In this example, proposition definitions may be added to the plurality of proposition definitions as additional threats are detected. In this manner policy elements may be chained together such that a value of $P(A|Z)$ takes the place of $P(A)$ for the next evaluation. In other words, for each proposition X, the term $P(X|A)/P(X)$ may be computed.

In embodiments, if the proposition is false for the route being evaluated, the analysis is similar, except that the converse of the proposition is considered. The probabilities can be calculated in a straightforward manner, since if the probability of something being true is known, then the probability of it being false is just 1 minus that. So, multiplication by the term $(1-P(Z|A))/(1-P(Z))$ is carried out for each proposition Z that is false. The policy elements are worked through and a choice is made whether to multiply by the "true" term, or the "false" term.

Example Policy Engine Operation

Figures 4A, 4B:
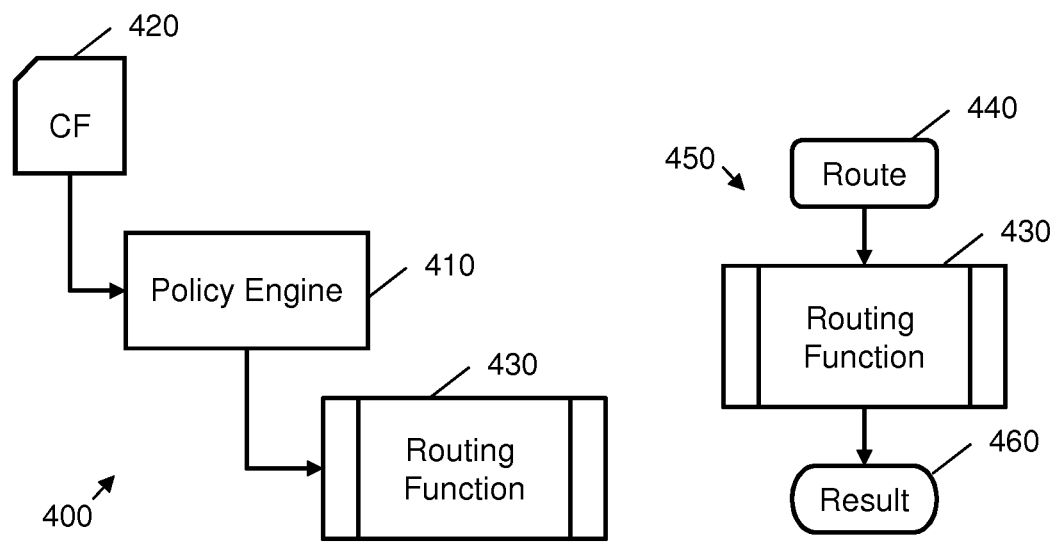
FIG. 4A is a schematic diagram showing implementation of a configuration file according to one or more embodiments of the present invention.
FIG. 4B is a schematic diagram showing a routing function according to one or more embodiments of the present invention.

FIGS. 4A and 4B show examples 400, 450 of policy engine operation. These examples may apply to policy engine 230 of FIG. 2A or policy engine 280 of FIG. 2B in certain cases.

FIG. 4A shows an implementation of a routing configuration file according to an example 400. The routing configuration file comprises a plurality of policy elements as shown in examples 300 and 330. In FIG. 4A a policy engine 410 accesses a routing configuration file 420. This file provides control instructions to implement a routing policy. In the present example, the policy engine 410 is arranged to implement a functional programming approach and convert the routing configuration file 420 into at least one routing function 430, e.g. based on one or more proposition definitions defined within the routing configuration file 420.

FIG. 4B shows how a routing function 430 is applied. Each routing function 430 is configured to receive a route object 440 as an input, e.g. as an argument variable, and to return a result 460 of applying the routing function to the route object. In this case the result 460 comprises a confidence value. The route object may comprise a network route definition, e.g. as received by a network interface in response to a route being advertised by another network device. The route object may comprise data defining one or more attribute values. The result 460 of the routing function is useable to determine a routing action, e.g. to determine whether a route is to be accepted, modified or rejected with regard to a routing definition. For example, the confidence value may be compared to one or more defined thresholds or threshold ranges. In one case the result 460 is used to indicate an action to be performed in relation to the route 440. The action to be performed may be configured to modify the route 440 to generate a modified route. In this case, a network control device comprising the policy engine 410, e.g. policy server 270, is arranged to transmit the modified route to at least one network device. Each network device is then arranged to receive and process the modified route to control a routing behavior of the network device. For example, the network device may have a simplified policy that modifies a routing definition based on the modified route, wherein the computationally intensive inference is already performed and represented in the modified route. In one case the modification may be performed by a routing engine instead of a local policy engine on the network device.

Example of Data Generation

Figure 5:
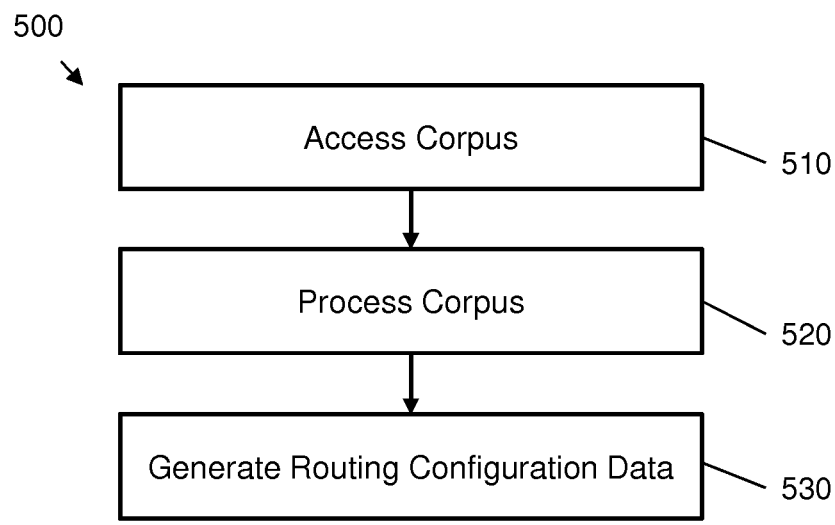
FIG. 5 is a flow chart showing a method for generating routing configuration data according to one or more embodiments of the present invention.

FIG. 5 shows a method 500 for generating routing configuration data according to an example. The method 500 may be used to generate the data for one or more policy elements as shown in FIGS. 3A and 3B.

At block 510, data indicative of a corpus of network route definitions is accessed. The corpus may comprise a plurality of records and/or data structures representative of previously advertised routes, e.g. in relation to BGP. Each network route definition in the corpus may comprise: data indicative of one or more route attributes and data indicating whether a route is suitable for use in routing network traffic. For example, the data indicative of one or more route attributes may comprise one or more of, amongst others: an IP prefix; a next hop; an AS path; any community labels; and additional metadata. Data indicating whether a route is suitable for use in routing network traffic may comprise a label deeming a route "good", i.e. suitable for use in routing network traffic, or "bad", i.e. not suitable for use in routing network traffic. The latter case of "bad" routes may be labelled based on routes that are known to be associated with fraudulent or malicious activity, e.g. as published by one or more security organizations. In certain cases, the data indicating whether a route is suitable for use in routing network traffic may be generated based on one or more white and/or black lists, e.g. known lists of authorized and unauthorized devices. The corpus may be generated by collecting advertised routes over a given period of time. In certain cases, the corpus may be weighted to prioritize more recent route updates, e.g. advertised routes in the last X months. Labels may be correlated with route attributes based on a recorded IP prefix or next hop. The corpus may be of any size, e.g. thousands, millions, or more routes.

At block 520, the data indicative of the corpus is processed to determine data indicative of one or more route attributes associated with a plurality of probability values. These plurality of probability values may comprise: a value for a probability of a route being suitable for use in routing network traffic; a value for a probability of a route having at least one route attribute; and a value for a conditional probability of a route having the at least one route attribute given the route being suitable for use in routing network traffic. For example, these probability values may comprise those of the form illustrated in FIGS. 3A and 3B. The value for a probability of a route being suitable for use in routing network traffic may be indicative of a proportion (applying a frequentist approach) of network route definitions in the corpus that are deemed "good", e.g. that are suitable for acceptance into a routing definition or table such as 160 in FIG. 1 or 240 in FIG. 2A. In the examples of FIGS. 3A and 3B, 0.9 or 90% of network route definitions were deemed suitable for use in routing network traffic. The value for a probability of a route having at least one route attribute may also be calculated based on proportions in the corpus. For example, the corpus may be processed to determine how many network route definitions have an AS path of 8 elements or more. In the examples of FIGS. 3A and 3B, 0.1 or 10% of network route definitions have this attribute property. Lastly, the conditional probability of a route having the at least one route attribute given the route being for use in routing network traffic may be determined by first partitioning the corpus into a set of routes that are labelled as "good". This set of routes may then be analyzed to determine the proportion of the set that have the given attribute property. In certain cases, the processing of block 520 may be repeated to generate probability data for multiple routing actions and/or route attributes.

At block 530, the result of the processing at block 520 is used to generate routing configuration data comprising at least one policy element. In this case, the policy element encodes the plurality of probability values. In one case, the policy elements may be of a form similar to the proposition definitions 310, 340 and 350 in FIGS. 3A and 3B. In another case, they may form part of a data store 290 as shown in FIG.

2B. The generated routing configuration data is for use in selectively or conditionally modifying a routing definition of a network device. For example, the routing configuration data may be encoded as a routing configuration file for communication to one or more network devices. Alternatively, the routing configuration data may be used by a policy engine such as 280 in FIG. 2B to indicate an action to be performed by modifying route data. In certain cases, the routing configuration data may comprise one or more policy elements that are communicable to one or more network devices as an update to an existing routing configuration file stored on the network devices. For example, the method 500 may be repeated as threats are identified so as to generate updated routing configuration data to address the threats. Identified threats may be encoded as IP addresses that are used to label network route definitions as "bad".

In certain cases, block 520 may comprise processing the corpus to identify statistically significant (e.g. as compared to a statistical metric) correlations between route attribute values and routes suitable for use in routing network traffic. Probability values associated with these correlated attribute values may then be calculated and encoded as one or more policy elements.

In certain cases, following block 530, the routing configuration data may be transmitted to one or more network devices, e.g. for receipt via network interface 22 as shown in FIG. 2A. For example, method 500 may be performed by a security server device that is arranged to generate policy updates for distribution to network devices.

In certain cases, block 510 may comprise accessing one or more external data sources to obtain data indicative of one or more route attributes. For example, a security server device implementing method 500 may obtain said data from one or more external storage devices and/or as a result of one or more remote queries. In one case, the network route definitions (e.g. BGP routes) may comprise one or more property-value pairs, such as "(IP_Prefix, 198.51.100.0/24)" for IP version 4 or "(IP_Prefix, 2001:DB8:64::/48)" for IP version 6. In this case, one or more of the property-value pairs may be used to retrieve additional metadata for the one or more route attributes. A value from a property-value pair may be used to perform a query on a data source external to the corpus and appending metadata from the query as an additional route attribute for a network route definition. For example, a "Who Is" lookup may be performed to obtain a string representative of an organization associated with a particular IP prefix (e.g. the prefix 203.0.113.0/24 may return "TEST-NET-3"). The string representation may then be appended as a route attribute value, e.g. for the route attribute "entity". This allows proposition definitions to be associated with human readable properties. For example, probabilities may be calculated for this additional metadata, expanding the attribute or property space beyond those attributes provided by a network route definition.

In certain cases, the one or more external data sources may be external to a security server device but internal to an autonomous system. For example, historical data from peer network devices within an autonomous system may be recorded and/or otherwise obtained by a security server device. This data may be used to define propositions that identify routes that have been stably advertised for months or years that then are suddenly advertised from obscure autonomous systems (these routes are likely to be a security threat). Other data sources may store data indicative of defined relationships between autonomous systems. These may be, for example, records of "peering" agreements between autonomous systems and/or lists of countries that are defined as a low security threat.

Figure 6:
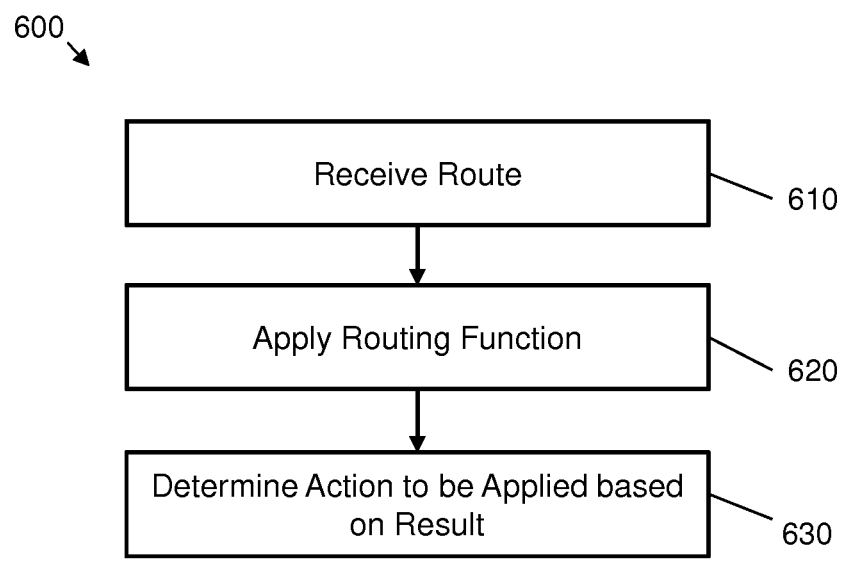
FIG. 6 is a flow chart showing a method for controlling route configuration in a network device according to one or more embodiments of the present invention.

FIG. 6 shows a method 600 for controlling a route configuration in a network device. This method may be applied by the policy engine 230 of FIG. 2A to implement a routing policy based on statistical inference. At block 610, a route is received. This route may be received in the form of a network route definition, e.g. as shown in FIG. 2A or 2B. At block 620, a routing function is applied to the received route to determine at least one confidence value for at least one property applicable to the network route. For example, this property may be at least one of: the route is suitable for use in routing network traffic or the route is not suitable for routing network traffic. This routing function may be the routing function shown in FIG. 4B. The routing function may be implemented by processing a routing configuration file as shown in FIG. 4A.

Block 620 may comprise determining a value for a route attribute associated with the received route. This may comprise parsing the network route definition. Following this statistical inference may be applied based on the determined value for the route attribute to determine the at least one confidence value (e.g. the resultant posterior probability $P(A|Z)$ in the examples above). This may comprise applying probability values encoded in policy elements and/or routing configuration files as shown in FIGS. 3A and 3B. In other cases, this may comprise a network request, e.g. to a security server device. Routing configuration data may be replied in response to the request, either in the form of a proposition or as an output probability. In the latter case, the routing function may be applied remotely, e.g. by the security server device, and a result of the function returned to the network device. In the former case data returned by a security server device or policy server 270 may be used to locally implement a routing policy, e.g. by a policy engine embodied in the network device. The result of the statistical inference comprises a confidence value associated with the route being suitable for use, i.e. is not a security threat or error. In one case, the confidence value is evaluated directly based on the determined probability; in other cases a plurality of probabilities may be determined, which may then be evaluated cumulatively to evaluate the confidence value. In the latter case, each probability may be based on a different route attribute associated with the received route.

At block 630 a confidence value generated by the routing function is compared with a set of confidence bands. An action to be applied is then determined, e.g. indicated and/or performed, based on the confidence value, e.g. based on the comparison with the set of confidence bands. A different action to be applied may be associated with each different confidence band. For example, in one case, responsive to the confidence value being above a predefined threshold, the received route may be added to a routing table. In another case metadata for the route may be modified and the modified route may be transmitted to network devices for policy processing. One action may involve discarding any received route. If a route is added to the routing table, either directly or indirectly based on the action, the method may comprise the additional block of using the routing table to direct packets of data in a network.

As described herein, an example of one application of the method of FIG. 6 may be the evaluation of cryptographic certifications of route origination. In comparative cases, for these to be of use, policy statements need to accept routes with these cryptographic certifications and to reject routes without these cryptographic certifications. However, this is a problem as the certification is slowly deployed; e.g. not all autonomous systems will use the certification standard. For example, certain "first mover" autonomous systems may wish to use this certification before they are used across the majority of autonomous systems. The comparative Boolean decision trees make this difficult to achieve. However, policy elements as described herein act to weight route acceptance in favor of certification without requiring all autonomous systems to use certification. As more autonomous systems do use certification of origin over time, the weighting applied when certification is used in a cumulative evaluation of probabilities will increase. Hence, certain examples herein enable a phased deployment of cryptographic security protocols and/or other features.

Certain examples described herein provide apparatus and systems for defining policy elements and associated data. In certain cases, the policy elements may be configured manually, e.g. by entering the proposition in some declarative language and populating the associated probability values. In other cases, machine learning systems may process a corpus of route data to generate proposition definitions and/or associated probability values. In certain cases, external data sources may be applied to automatically generate and update proposition definitions and their probabilities. Certain examples of policy elements described herein provide a set of propositions with associated probabilities: one probability value associated with the proposition being true of all routes and another probability value associated with the proposition being true of routes that should be accepted by a network device, e.g. routes that are genuine and do not pose a security risk or threat.

Certain methods as described above may be implemented in a hardware controller of a network device and/or a processing environment of a computer system. Respective examples are shown in FIGS. 7A and 7B.

Figure 7A:
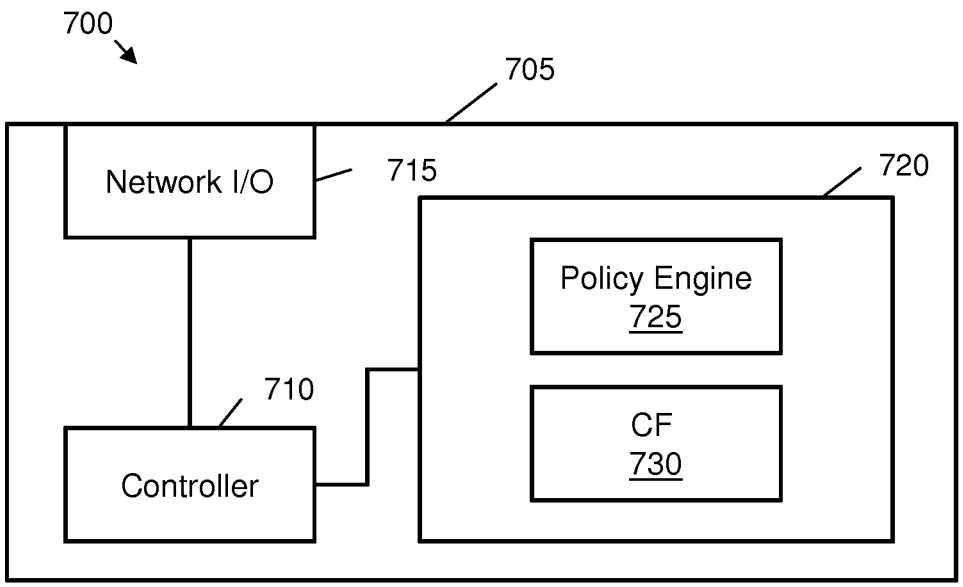
FIG. 7A is a schematic diagram showing components of a network device according to one or more embodiments of the present invention.

FIG. 7A shows an example 700 of a network device 705. As with the other Figures, this illustration is schematic and certain features have been omitted for clarity of explanation. The network device 705 comprises a controller 710, a network interface 715 and computer-readable medium 720. The controller 710 may comprise one or more microprocessors, e.g. comprise a system-on-chip or a programmable logic controller. The computer-readable medium 720 may comprise a (non-transitory) storage device accessible to the controller 710 such as a non-volatile memory. In this example, the computer-readable medium 720 stores program code arranged to implement a policy engine 725 and data comprising a routing configuration file 730. In certain examples, these two objects need not be stored in a common computer-readable medium, e.g. may be stored in different and/or separate storage mediums accessible to the controller 710. The program code of the policy engine 725 is executable by the controller 710 to cause the network device to perform at least one of the methods described above. The network device 705, in use, performs network routing functions by sending and/or receiving network traffic via the network interface 715, which may comprise one or more physical network ports. The network device 705 performs network routing functions by implementing the policy engine 725 according a specification/configuration defined by the routing configuration file 730, e.g. the policy engine 725 implements a routing function that is applied to a route object.

Figure 7B:
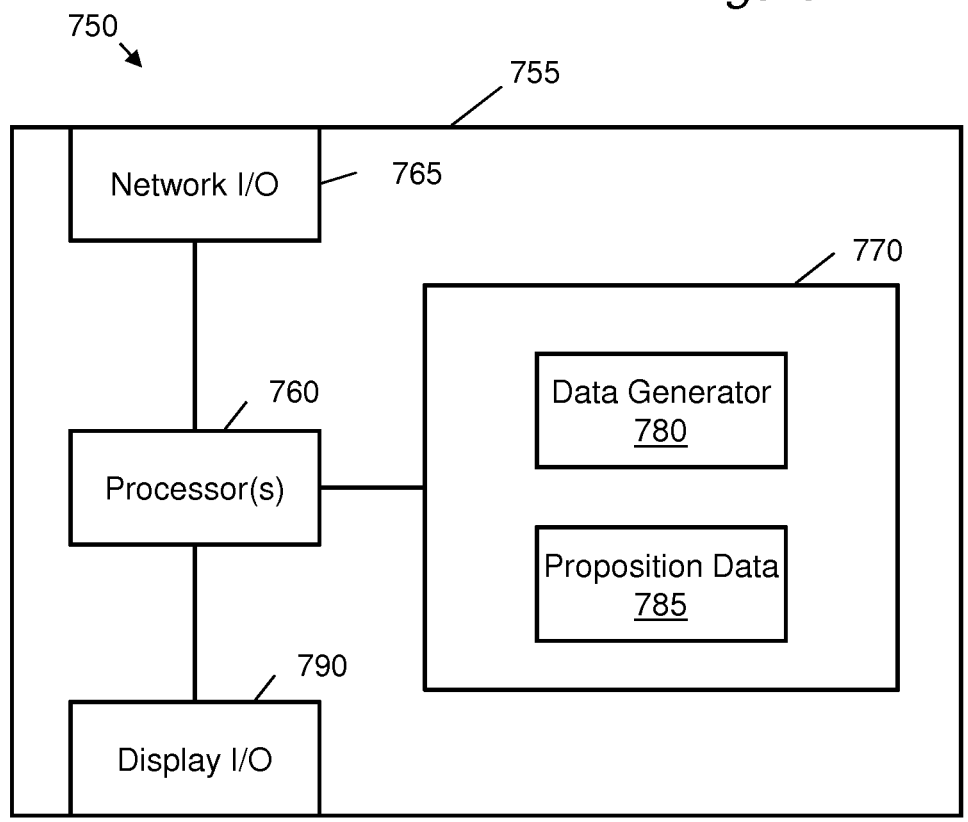
FIG. 7B is a schematic diagram showing components of a computer device implementing a file editor according to one or more embodiments of the present invention.

FIG. 7B shows an example 750 of a computer device 755. As set out above, this illustration is schematic and certain features have been omitted for clarity of explanation. The computer device 755 comprises one or more processors 760 (e.g. central processing units—CPUs), a network interface 765 and computer-readable medium 770. The computer-readable medium 770 may comprise a (non-transitory) storage device accessible to the processors 760 such as random access memory (RAM) and/or a solid state or magnetic storage device. In a case where the computer-readable medium 770 comprises RAM, the contents of the memory may be loaded from a non-volatile storage device. In this example, the computer-readable medium 770 stores program code arranged to implement a data generator 780 that generates proposition data 785. The program code of the data generator 780 is executable by the one or more processors 760 to perform at least a portion of at least the method 500 of FIG. 5. The computer device 755 may thus comprise a security server device or policy server as described above. In certain cases, the computer device 755 may comprise a display interface 790 as shown in FIG. 7B. This may be used by a system user to view the proposition data 785 and/or to use the data generator 780 to enter probability values that may then be transmitted to one or more network devices as described above. Any method described herein may be computer-implemented, e.g. by a server or embedded computing device.

In any of these examples the routing configuration file may comprise a markup language definition file and/or a definition such as a YAML file. In certain cases, the routing configuration file may be seen as a form as computer program code, having policy elements, which may also be implemented as a form of subroutine or policy statement. Certain examples described herein may be implemented for a network device that filters routes according to the Border Gateway Protocol.

The above description describes a number of illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A network control device for managing data packet routes used on at least one network according to at least one of an interior gateway protocol and an exterior gateway protocol, comprising:
 a policy engine arranged to receive, over a network interface, a proposed network route for data packets within the at least one network, and to process said proposed network route based on a plurality of policy elements, to implement at least one of the interior gateway protocol and the exterior gateway protocol,
 wherein each policy element comprises:
   data defining a proposition, the proposition relating to at least one property of a received network route within the at least one network;
   data indicative of a probability of the proposition being true of a randomly-selected network route for the at least one network, and
   data indicative of a probability of the proposition being true of a randomly-selected network route that is suitable for use in routing network traffic within the at least one network,
 wherein the policy engine is configured to process the proposed network route by evaluating the plurality of policy elements in accordance with at least one property of the proposed network route using Bayesian inference to determine a confidence value relating to use of the proposed network route, wherein the policy engine is configured to select an action to be performed in relation to the proposed network route based on the confidence value, wherein said action determines how the proposed network route is to be used by at least one network routing device within the at least one network in implementation of at least one of the interior gateway protocol and the exterior gateway protocol.

2. The network control device of claim 1, wherein the action to be performed modifies the proposed network route to generate a modified proposed network route and wherein the network control device is arranged to transmit the modified proposed network route to at least one network device, each network device being arranged to receive and process the modified proposed network route to control a routing behavior of the network device.

3. The network control device of claim 1, wherein the plurality of policy elements form part of a routing configuration file, the routing configuration further comprising data indicative of a prior probability, the prior probability being a probability that a randomly-selected route is suitable for use in routing network traffic.

4. The network control device of claim 1, wherein the action to be performed comprises at least one of:
adding the proposed network route to a routing definition, the routing definition comprising one or more routes that are used by a network device to route network traffic;
modifying at least one attribute of the proposed network route within the data indicative of the network route;
rejecting the proposed network route for use in routing network traffic; and
flagging the proposed network route for further processing.

5. The network control device of claim 1, wherein the policy engine is arranged to receive data for the plurality of policy elements from a data source external to the network control device.

6. A routing configuration file arranged to implement a routing policy for one of an interior gateway protocol and an exterior gateway protocol, comprising:
a plurality of policy elements for the routing policy, each policy element being configured to probabilistically associate a suitability of a network route defined according to said one of the interior gateway protocol and the exterior gateway protocol with at least one property of the network route, the network route and the at least one property being defined in a network route definition exchangeable between network devices;
an encoding of a value indicative of a prior probability indicative of the suitability of a randomly-selected network route for routing network traffic,
wherein each policy element comprises data encoding:
data defining a proposition, the proposition relating to the at least one property of the network route as indicated by the network route definition;
data indicative of a probability of the proposition being true of a randomly-selected network route, and
data indicative of a probability of the proposition being true of randomly-selected network route that is suitable for use in routing network traffic,
the routing configuration file being configured to be implemented as a routing function that is applied to a network route definition that is received over a network, the received network route definition indicating a value for the at least one network property, the routing function applying the encoded values in a Bayesian inference operation to output a value indicative of whether the received network route definition is to be used by a network device to route network traffic.

7. The routing configuration file of claim 6, wherein the routing function is configured to evaluate the encoded values using Bayesian inference to determine a posterior probability indicative of the suitability of a network route.

8. A method for managing data packet routes used on at least one network according to at least one of an interior gateway protocol and an exterior gateway protocol, the method comprising:
receiving, at a network interface of a network control device, a proposed network route for data packets within the at least one network;
processing, by a processor of the network control device, the received proposed network route by evaluating a plurality of policy elements in accordance with at least one property of the proposed network route using Bayesian inference to determine at least one confidence value relating to use of the proposed network route, wherein each policy element comprises:
data defining a proposition, the proposition relating to at least one property of a received network route within the at least one network,
data indicative of a probability of the proposition being true of a randomly-selected network route for the at least one network, and
data indicative of a probability of the proposition being true of a randomly-selected network route that is suitable for use in routing network traffic within the at least one network; and
determining, by the processor of the network control device, an action to be performed in relation to the proposed network route based on the at least one confidence value,
wherein said action determines how the proposed network route is to be used by at least one network routing device within the at least one network in implementation of at least one of the interior gateway protocol and the exterior gateway protocol.

9. The method of claim 8, wherein the at least one property applicable to the proposed network route comprises an indication of a suitability for routing traffic over the at least one network.

10. The method of claim 8, wherein determining an action comprises:
comparing the at least one confidence value to at least one range of values, wherein each range of values is associated with a different action, and
based on the comparison, selecting the action to be performed; and
wherein the method comprises:
performing the selected action to modify the proposed network route to generate a modified network route, the modified network route being used to determine whether to modify a routing definition of a network device.

11. The method of claim 8, wherein the action comprises at least one of:
indicating that the proposed network route is to be added a routing definition, the routing definition comprising one or more routes that are used by a network device to route network traffic;

indicating that at least one attribute of the proposed network route is to be modified within the routing definition;

indicating that the proposed network route is to be rejected for use in routing network traffic; and flagging the proposed network route for further processing.

12. The method of claim 8, wherein processing the received proposed network route comprises applying Bayesian logic cumulatively using the plurality of policy elements, each policy element indicating probabilities for use in the Bayesian inference.

13. The method of claim 8, comprising:

comparing the at least one confidence value to a threshold, the threshold being associated with a set of one or more actions to be applied, and based on the comparison, selecting the action to be performed from said set of one or more actions; and wherein the method comprises:

performing the selected action to conditionally modify a routing table, the routing table comprising one or more routes that are used by a network device to route network traffic.

14. The method of claim 8, wherein the exterior gateway protocol comprises the Border Gateway Protocol.

* * * * *